Nov. 3, 1936.  J. C. THOM  2,059,416
APPARATUS FOR AND METHOD OF MAKING POUCH LIKE CONTAINERS
Filed July 11, 1934  9 Sheets-Sheet 1
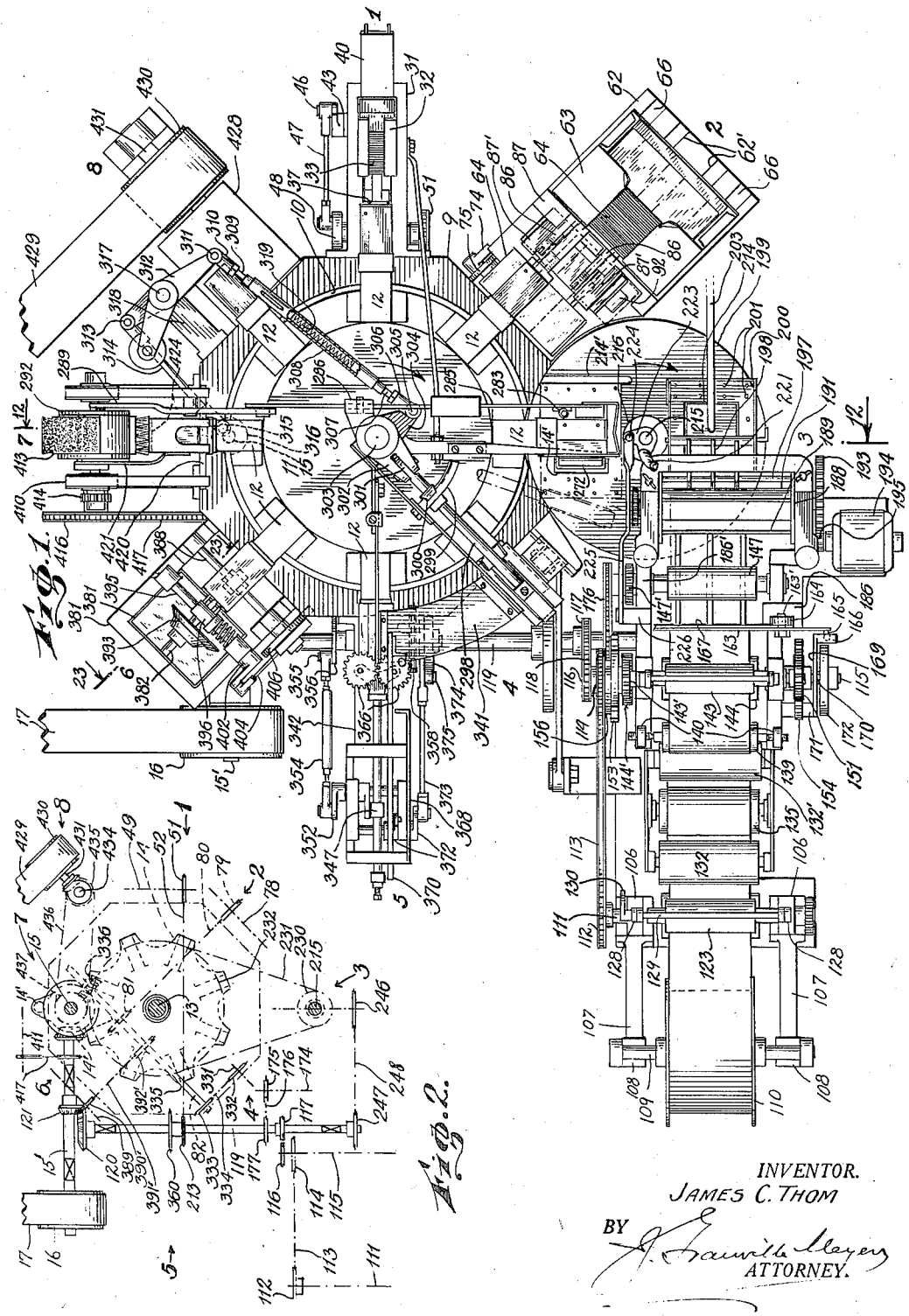
INVENTOR.
JAMES C. THOM
BY
ATTORNEY.

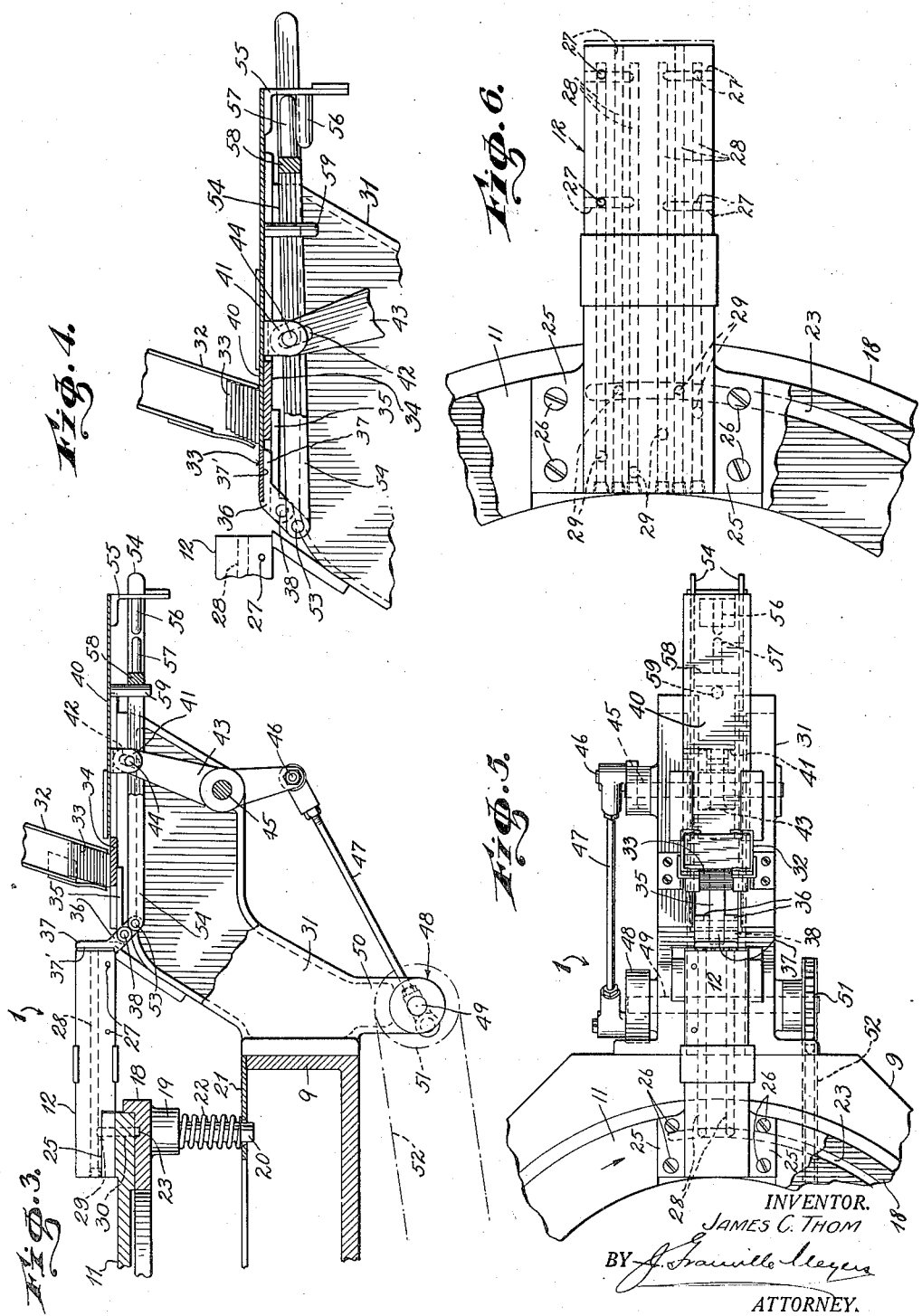

Nov. 3, 1936.　　　　　J. C. THOM　　　　　2,059,416
APPARATUS FOR AND METHOD OF MAKING POUCH LIKE CONTAINERS
Filed July 11, 1934　　　9 Sheets-Sheet 3
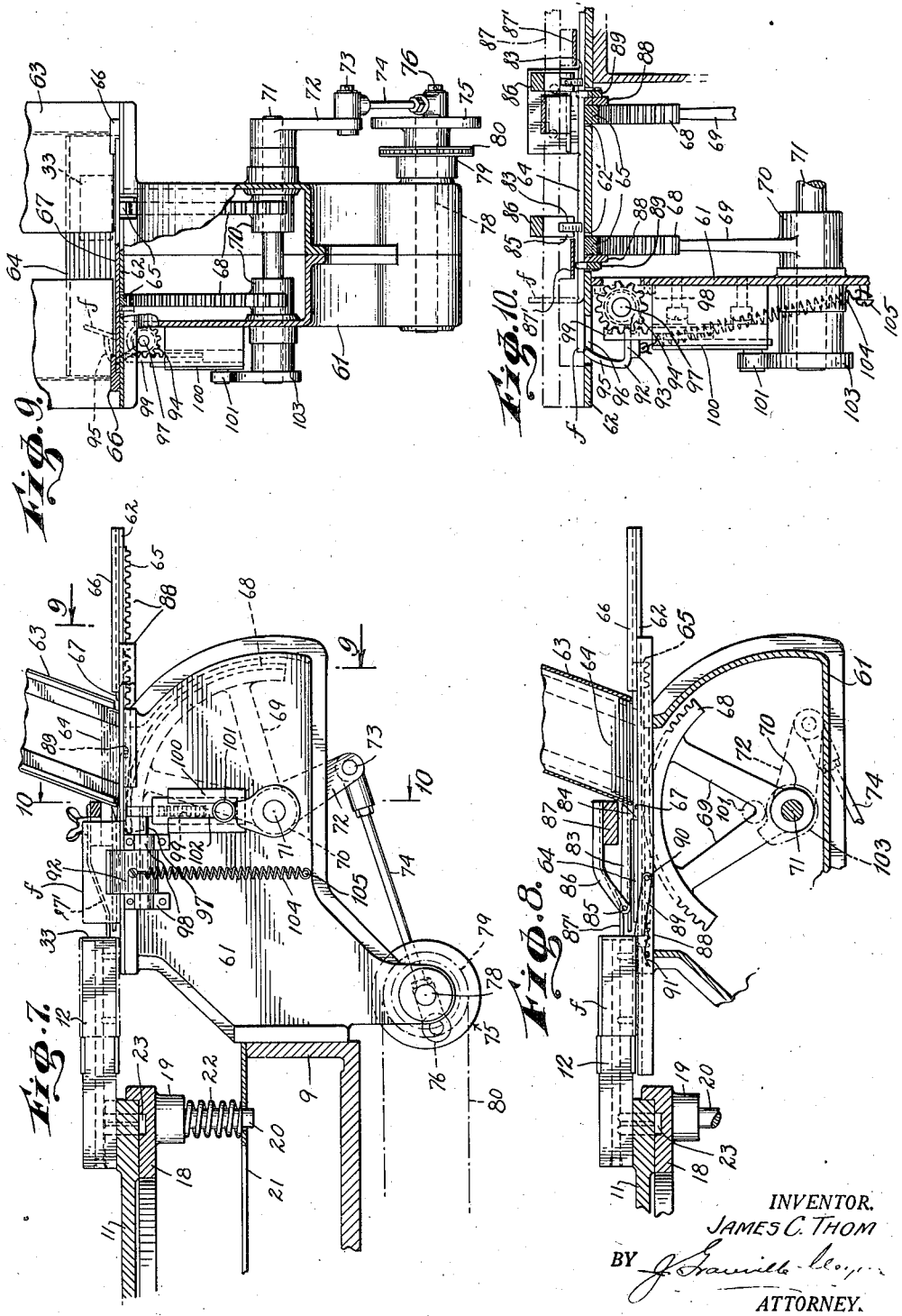
INVENTOR.
JAMES C. THOM
BY
ATTORNEY.

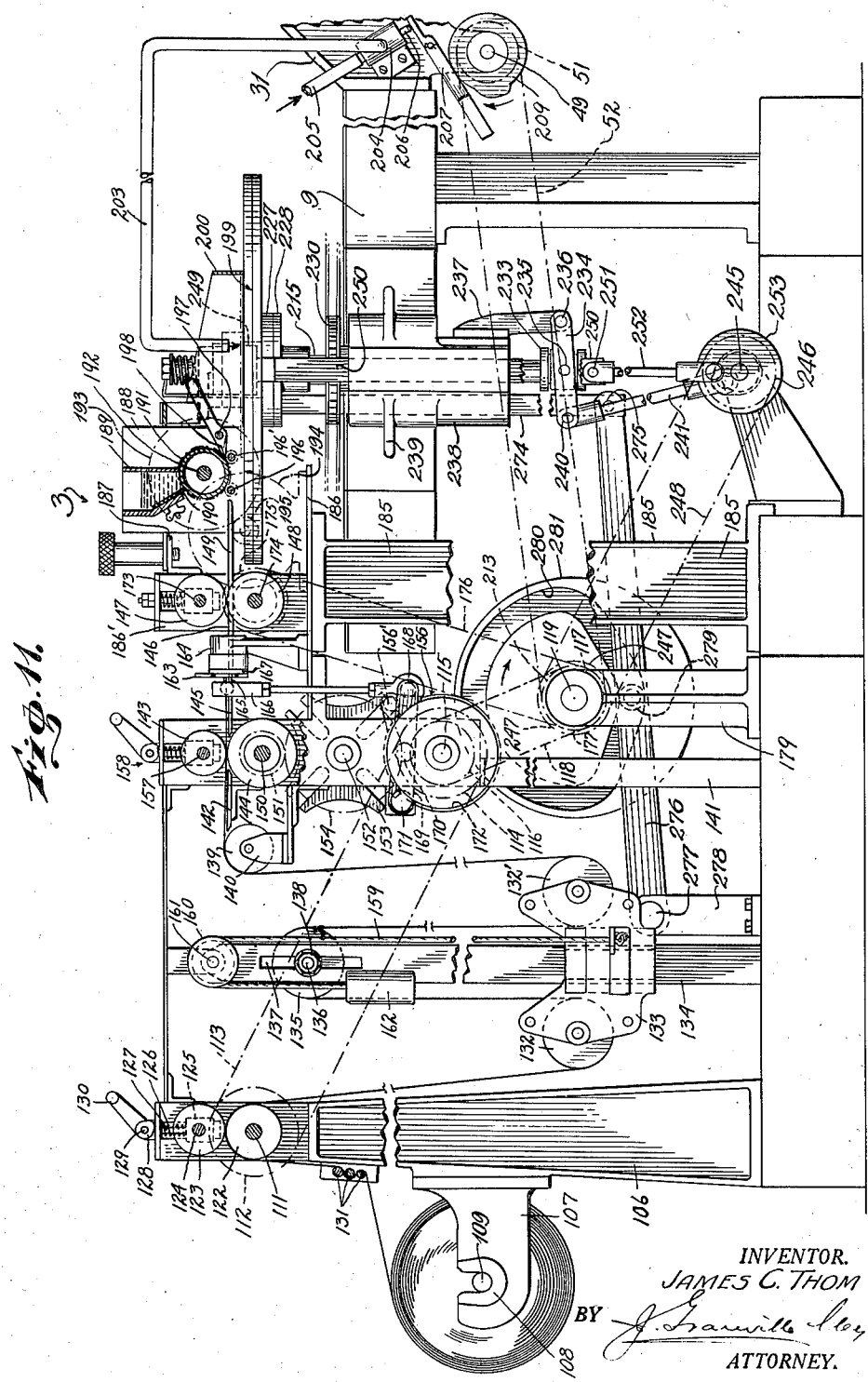

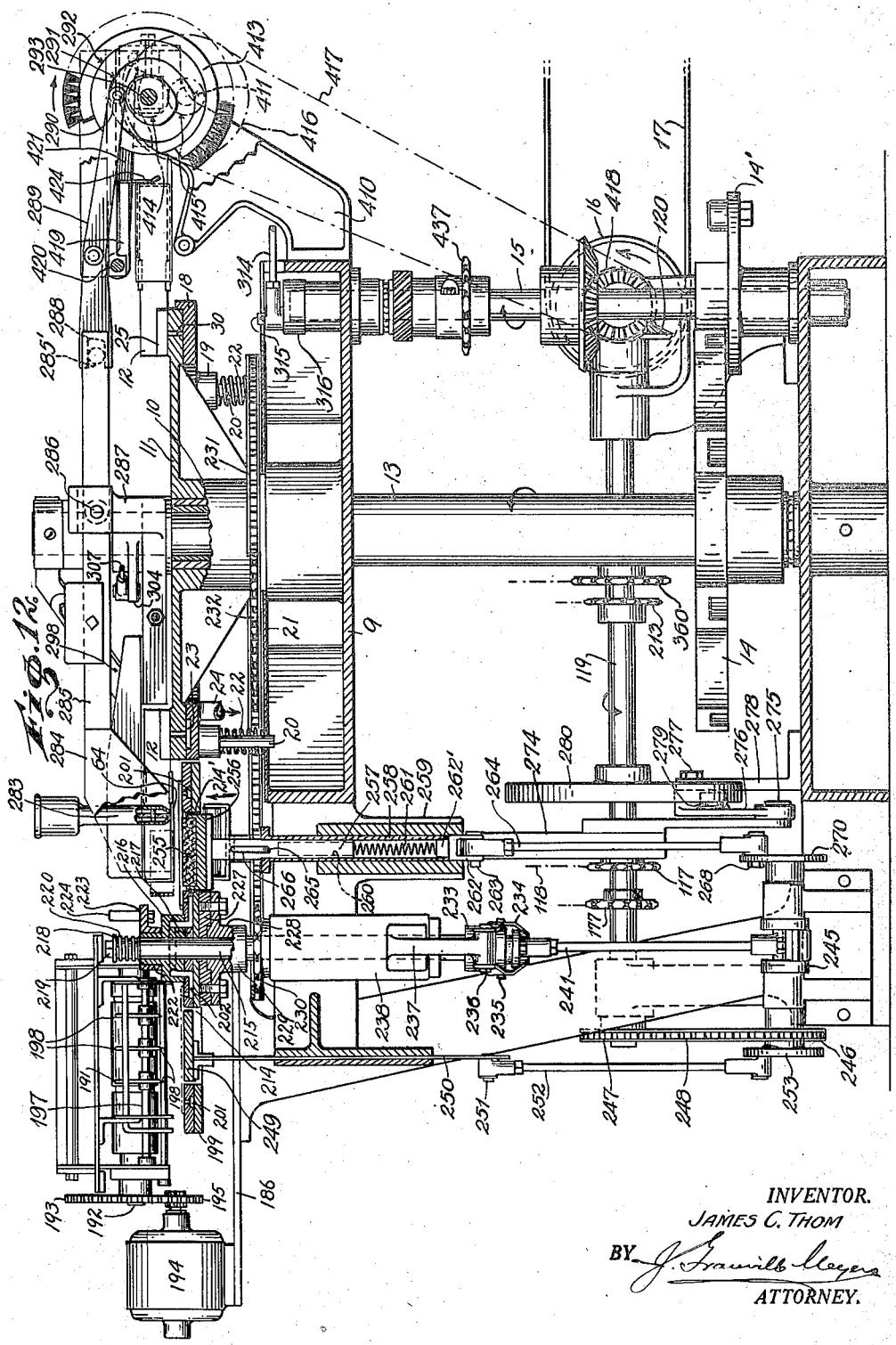

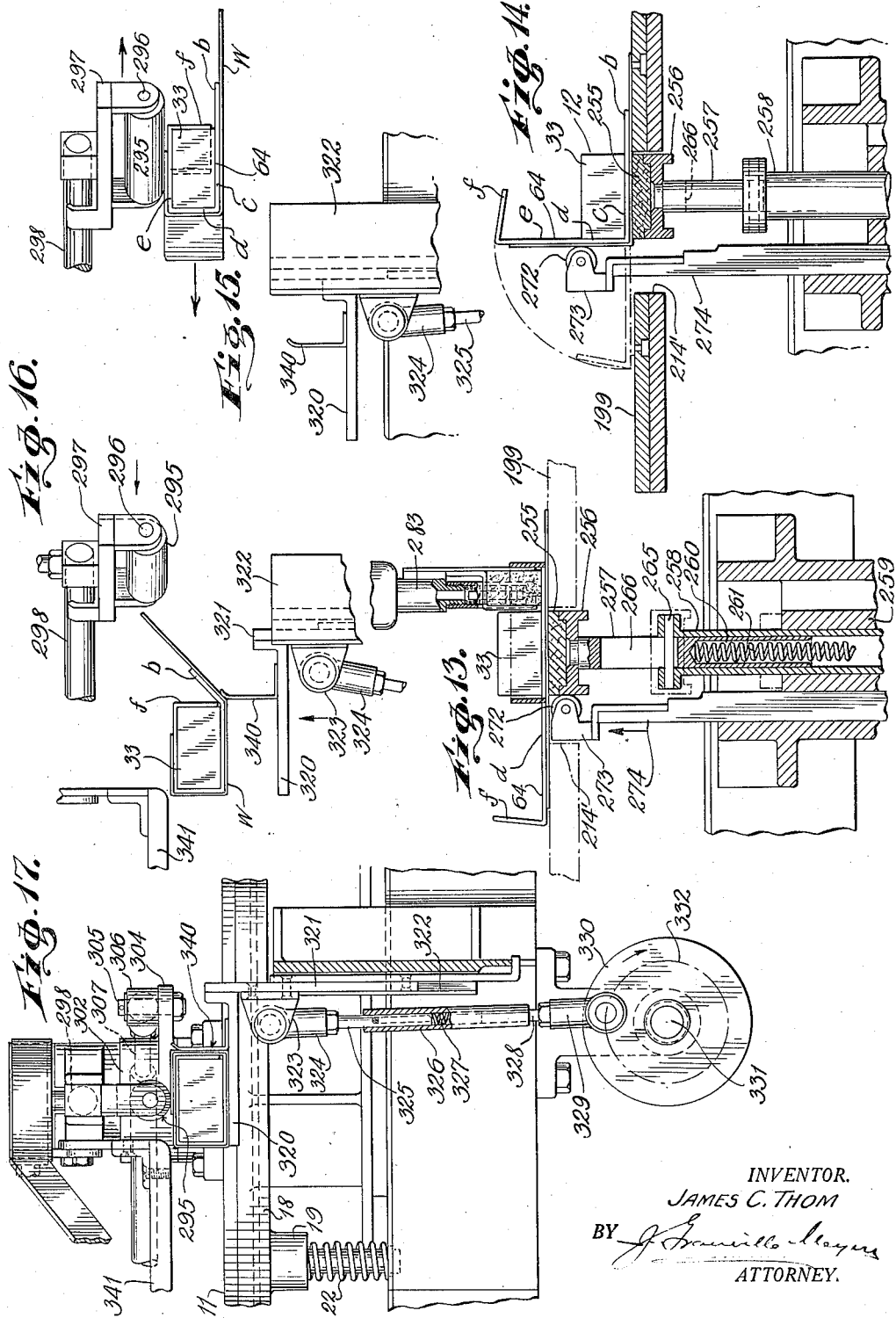

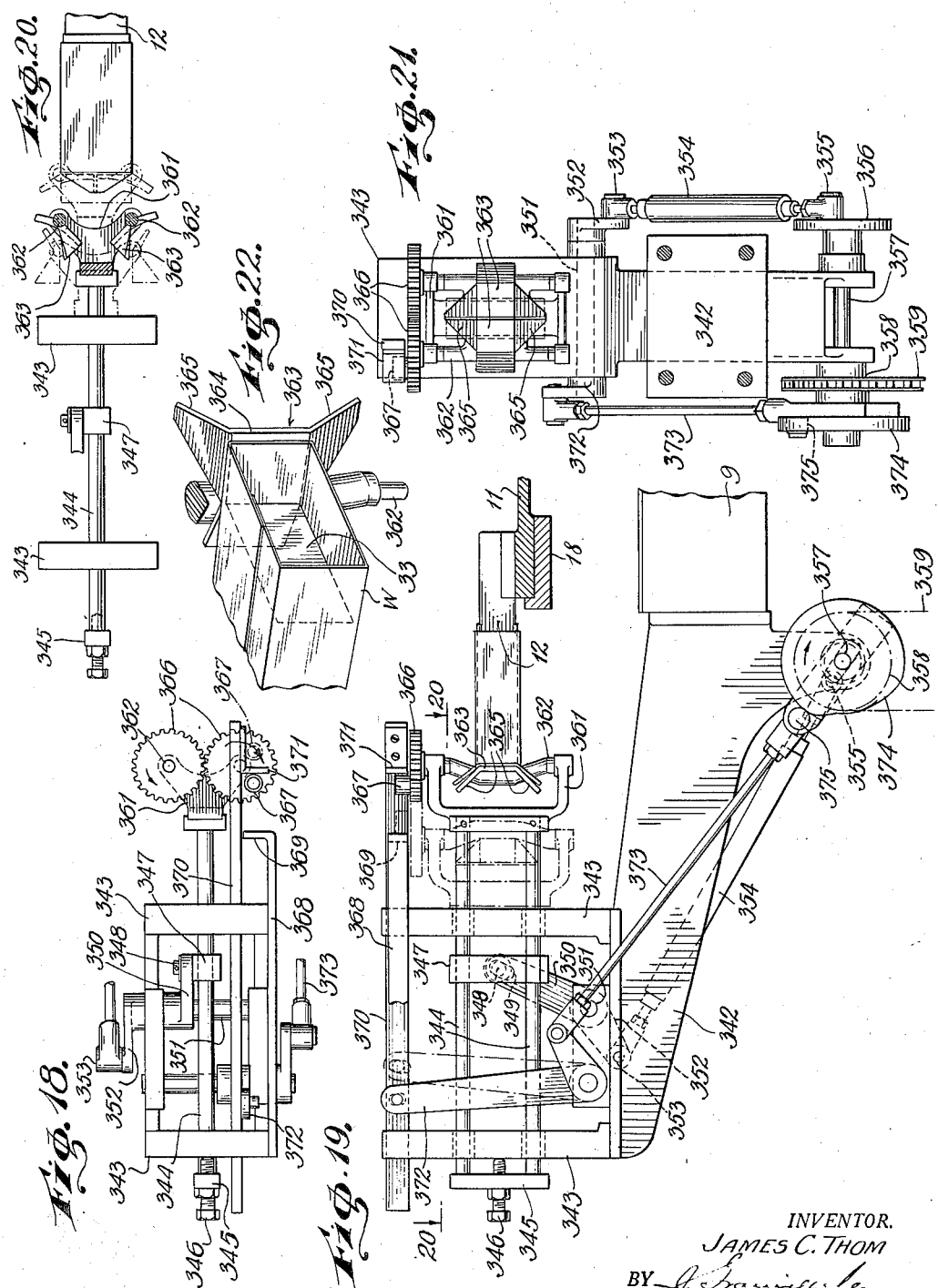

Nov. 3, 1936.                J. C. THOM                 2,059,416
       APPARATUS FOR AND METHOD OF MAKING POUCH LIKE CONTAINERS
                    Filed July 11, 1934        9 Sheets-Sheet 8
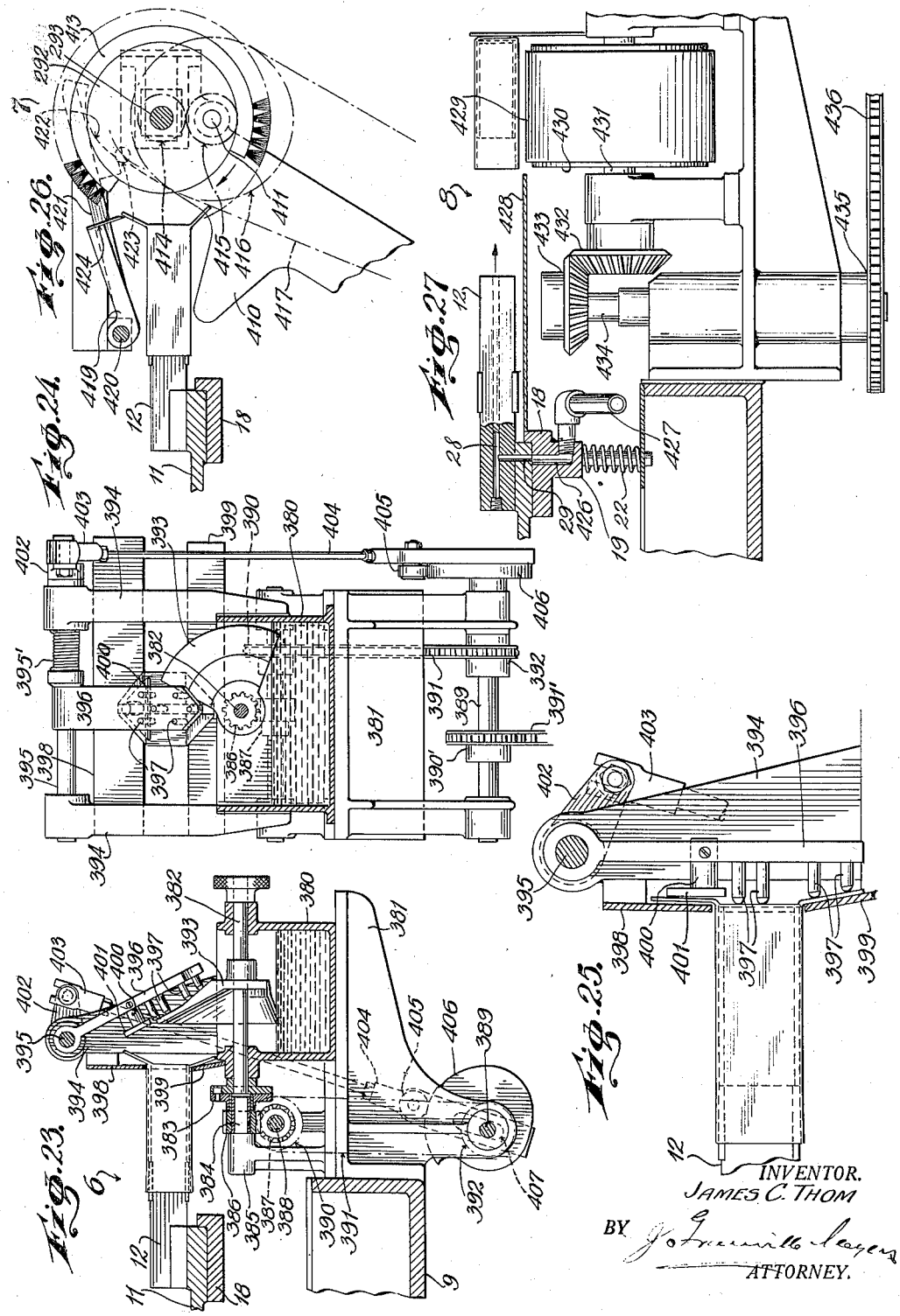
INVENTOR.
JAMES C. THOM
BY
                    ATTORNEY.

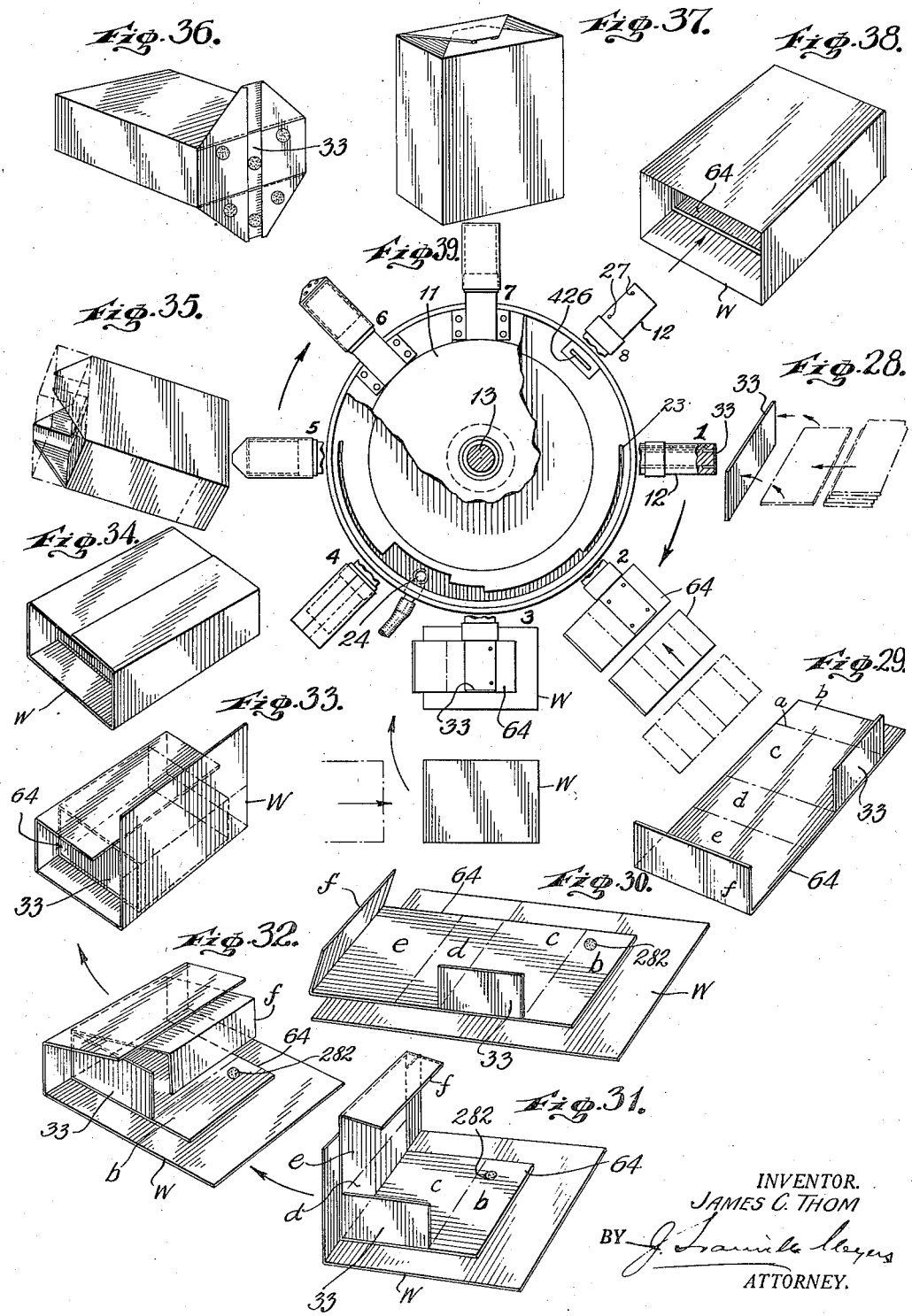

UNITED STATES PATENT OFFICE 2,059,416

APPARATUS FOR AND METHOD OF MAKING POUCH-LIKE CONTAINERS

James C. Thom, Chicago, Ill., assignor to United States Tobacco Company, New York, N. Y., a corporation of New Jersey Application July 11, 1934, Serial No. 734,685

21 Claims. (Cl. 93—39)

My invention relates to apparatus for and method of forming pouch-like containers.

In this application I have illustrated and will describe the invention in connection with a container of the type, which, so far as I am aware, prior to my invention was always produced by hand. Such a container includes a sheet of strawboard, cardboard, or the like, bent to form four walls of the container, the ends of which are closed by separate inserts. Around this structure there is applied a wrapper, and under the hand method of making these containers the production was slow and consequently costly.

In accordance with my present invention containers exactly of the type above described, and presenting all of the appearance of those made by hand are produced by apparatus embodying an endless carrier for moving forming horns to several points or stations where, and between some of which, the steps for mechanically forming each pouch-like container are successively performed, with a plurality of pouch-like containers being continuously in process of manufacture.

The principal general object of the invention may therefore be said to reside in mechanically producing pouch-like containers of the above type including an end closure and four walls with a wrapper therearound having all of the characteristics and general appearance of those previously made by hand. Such containers may be used for packaging tobacco or other materials, which have been sold for many years in a particular style or type of container known to the public, so that there will be no danger of loss of trade due to a change in appearance or structure of package. In this connection, I would mention the fact that even a slight change in the style or appearance of a known type of container or package, especially for tobacco and tobacco products, is likely to result in the loss of trade, for it is peculiar to many smokers and users of tobacco that they assume from a change in package that there has been a change in the quality of the merchandise. Such, of course, is not necessarily the case, but this peculiar attitude on the part of many persons necessitates, under present business methods and conditions, the mass production of containers formerly made by hand with a view to a reduction in cost without sacrificing the quality of the merchandise or changing the appearance of the package.

I will not dwell here in detail on the objects and advantages of the invention, as the same will be specifically pointed out during the course of the following detailed description of the apparatus shown in the accompanying drawings, but a general description of the invention should be helpful to a clear understanding of the views in the drawings.

What I have hereinbefore referred to as forming horns moved by an endless carrier include forms corresponding in external dimension and shape approximately to the internal dimension and shape of the completed pouch-like containers, and having suction ports opening on their several faces with the ports on each face communicating with passages extending through the form and communicating respectively at predetermined intervals with other passages leading to suction apparatus, so that when one of the forms arrives at station No. 1, for instance, the end closure may be placed against the end of the form and held thereto by suction. Thereafter this form is moved to station No. 2 carrying the end closure, while the succeeding form moves to station No. 1. At station No. 2 the first mentioned form has fed thereto one of the straw board blanks in contact with one of its faces, and at the same time another end closure blank is being applied to the succeeding form at station No. 1. While these operations have been taking place, the outside wrapper sheet is being fed through feeding mechanism from a continuous strip from which the wrapper to be applied to the blank on the first mentioned form has been cut to proper length, had adhesive applied thereto, and placed in position to properly register with the straw board blank carried by the first mentioned horn when it arrives at station No. 3. Upon arrival of the first mentioned form and blank carried thereby at station No. 3, the wrapper and blank are brought into contact and adhesively united with the ends of the wrapper projecting beyond the edges of the blank and beyond the end closure on the form or horn. The wrapper, blank and end closure thus associated, are then carried through succeeding stations during which the blank and wrapper are folded around the horn and edges of the end closures, the blank being held held to the several faces of the horn by suction at each face in the manner previously described in connection with the end closure. Eventually the blank and wrapper are completely bent around the horn and form a tubular rectangular structure with the wrapper projecting beyond the ends of the blank, after which the ends of the wrapper are partially folded in, pasted and then completely folded against the said end closure. After completion of the pouch-like container in the foregoing manner on the first mentioned horn, the suction is all released and eventually the container with one end open for filling is blown from the form or horn and conveyed away for filling. The first mentioned form which carried the container and from which the container was blown or removed then returns to station No. 1 and the foregoing operations are repeated, it being understood that each successive horn or form held by the endless conveyor moves successively through the same steps described in connection with the first mentioned horn and that the operation is continuous, there being several pouch-like containers continuously in process of formation at the same time.

In the accompanying drawings:

Fig. 1 is a top plan view of apparatus embodying the invention showing generally the arrangement of the forming horns, endless conveyor, and mechanism at the several stations at which the steps are performed;

Fig. 2 is a diagrammatic view of the parts shown in Fig. 1 and illustrating the driving or operating parts for the conveyor and the mechanism at the several stations;

Fig. 3 is a side elevation partly in section of the mechanism at station No. 1 applying an end closure to the form or horn;

Fig. 4 is a view similar to Fig. 3 showing the parts in another position or feeding an end closure from the magazine;

Fig. 5 is a top plan view of station No. 1 with parts shown in the position of Fig. 3;

Fig. 6 is a top plan view of one of the forming horns showing the suction ports leading therethrough;

Fig. 7 is a view partly in section and partly in elevation of the apparatus at station No. 2 supplying a blank which forms the four walls of the container to the forming horn;

Fig. 8 is a view similar to Fig. 7 showing parts in a different position;

Fig. 9 is a view on the line 9—9 of Fig. 7;

Fig. 10 is a view on line 10—10 of Fig. 7 but similar to Fig. 9 and showing the parts in the position shown in Fig. 8;

Fig. 11 is a side elevation of station No. 3 showing the apparatus for forming and feeding the wrappers to the horn and blank carried thereby from station No. 2;

Fig. 12 is a view taken on the line 12—12 of Fig. 1;

Fig. 13 is a fragmentary detailed enlarged view partly in section and partly in elevation showing the relative position of the blank and wrapper upon arrival of the forming horn at station No. 3;

Fig. 14 is a view similar to Fig. 13 showing the relative position of the blank wrapper and forming horn just prior to movement from station No. 3;

Fig. 15 is a fragmentary view showing a folding operation which takes place between stations 3 and 4;

Fig. 16 is a view similar to Fig. 15 showing the beginning of another fold at station No. 4;

Fig. 17 is a view partly in elevation and partly in section showing the apparatus of station No. 4 and the blank and wrapper completely encircling the forming horn at station No. 4;

Fig. 18 is a top plan view of apparatus at station No. 5;

Fig. 19 is a side elevation of the apparatus at station No. 5 and showing the forming horn, blank, and wrapper carried thereby in position for partial folding of the ends of the wrapper;

Fig. 20 is a view taken on the line 20—20 of Fig. 19;

Fig. 21 is an end view of the apparatus and parts shown in Fig. 19;

Fig. 22 is a fragmentary enlarged perspective view showing one of the elements for folding the ends of the wrapper forming part of the mechanism shown in Figs. 19 and 21;

Fig. 23 is a side elevation partly in section of apparatus at station No. 6 for applying adhesive to the wrapper;

Fig. 24 is an end view of the apparatus shown in Fig. 23;

Fig. 25 is an enlarged fragmentary view of the adhesive applying member forming part of the apparatus shown in Fig. 23;

Fig. 26 is a side elevation of apparatus at station No. 7 for completing the folding of the wrapper;

Fig. 27 is a side elevation with parts broken away at station No. 8 showing the means for removing the container from the forming horn and conveying it away;

Figs. 28–38 inclusive are perspective views showing the parts of which the container is made from the first step to its completion, successively; and Fig. 39 is a top plan view of the endless conveyor, forming horns, and showing the formation of the container thereon in proximity and association with Figs. 28–38 respectively.

In Figs. 1 and 2 of the drawings, the several stations at which the steps in the formation of the container are performed are numbered respectively 1, 2, 3, 4, 5, 6, 7 and 8, the same being located at spaced intervals around and on the frame 9 within which is rotatably mounted the turret 10. As shown in Fig. 12, the turret 10 includes a top or table 11 to which are fixedly secured at regular spaced intervals, the forms or horns 12 on which the containers are produced. The table 11 is fixedly secured to the shaft 13, which is rotated by Geneva gear mechanism indicated generally at 14 and driven by a disc 14′ on shaft 15 which is connected to a pulley 16 (Fig. 2) which is rotated by belts 17 from any suitable source of power, not shown.

Referring back to Fig. 12, it will be noted that the table 11 rests on a support 18 having depending bosses 19 which receive dowel pins 20 which also extend into fixed frame 9 through which the shaft 13 extends. Coil springs 22 surround the rods 20 and abut the top of the frame 21 and the bottom of the bosses 19 to yieldably urge the plate 18 into engagement with the table 11. The plate 18 is fixed and not rotatable, and as shown best in Figs. 3, 6, 12 and 39 has formed in its upper face an arcuate groove 23 extending from in front of station No. 1 to the front of station No. 5. As shown best in Fig. 39, the groove 23 between stations Nos. 1 and 2 is relatively narrow but becomes wider between stations Nos. 2 and 3 and wider still between stations Nos. 3 and 4, and then between stations Nos. 4 and 5 abruptly terminates into another narrow end similar to that between stations Nos. 1 and 2. Referring again to Fig. 12, a pipe 24 leads to suction apparatus, not shown, and communicates with the passage 23. Referring to Fig. 6 where one of the forming horns is shown in detail as comprising a rectangular block having at one end lateral extensions 25 through which screws 26 are mounted, the screws extending into the table 11 to rigidly secure the horn to the table for rotation therewith. The horn 12 extends radially outward from the table 11. At its outer end portion and on each of its faces, each of the horns 12 is provided with ports or openings 27 which communicate with longitudinal passages 28 in the horn. There are also ports 27 in the outer end of the horn communicating with passages leading longitudinally through the horn. Above the table 11 the passages 28 communicate with ports 29 which are arranged to successively register with the different portions of the groove 23 as the table 11 rotates. For instance, the passages 28 communicating with the ports in the end of the horn 12 at station No. 1 are established in communication with the narrow end of the groove 23 and at station No. 2 the ports on the bottom face of the horn and their passages will be established in communication with the channel 23 at station No. 2, and so on, as hereinafter more completely explained. As shown in Fig. 12, there are passages 30 through the table corresponding to the passages 29 and in registry therewith and through which communication with groove 23 is established.

Before proceeding with the detailed description of the construction and operation of the apparatus for performing the steps in making the container, that is, the mechanism at each of the stations, I would have it clearly understood that as the shaft 13 is driven by the Geneva gear mechanism 14, that the table 11 and forming horns 12 mounted thereon at regular intervals rotate so that each of the horns stops at and passes successively each of the stations. The number of horns corresponds to the number of stations.

With the foregoing in mind and referring to Figs. 3–5 which specifically relate to station No. 1, the numeral 31 designates a support in the nature of a bracket rigidly connected to the frame 9, extending outwardly from one side thereof. The bracket 31 is formed at its top with a horizontal portion, the top of which is substantially in alinement with the top of the table 11. On this horizontal portion of the bracket 31 and above its top there is mounted a magazine 32 in which are stacked the end closures for the containers in the nature of cardboard or strawboard pieces 33 which feed down to the bottom of the magazine by gravitation. The front and back walls of the magazine terminate above a plate 34 a distance equal to the thickness of the end closures 33, so that the lowermost end piece may be pushed from beneath the stack in the manner hereinafter described. The front edge of the plate 34 is located substantially in alinement with the front lower edge of the magazine, and immediately in front of the plate 34 and therebelow is a hinge bracket 35 which is between the arms 36 of a pusher 37 pivotally mounted on pin 38 through the arms 36 and stop 35. Face 37' of the pusher 37 will be positioned by the stop 35 in alinement with the plate 34 to receive one of the end pieces when pusher 37 is oscillated on the pivot 38 from the position of Fig. 3 to that of Fig. 4. The mechanism which feeds the lowermost end closure from the magazine on to the face 37', comprises a slide 40 substantially of the same thickness as the end pieces 33 and normally located back of the magazine 32 in the position shown in Fig. 3, resting on the top of the bracket 31. The slide 40 has depending lugs 41 through which, and a slot 42 in the upper end of the bell crank lever 43, is mounted a pin 44. The bell crank lever is pivotally connected on the bracket at 45, and its lower arm is pivotally connected at 46 to the rod 47 connected to the crank mechanism designated generally by numeral 48 and journaled on the shaft 49 mounted through depending portions 50 of the bracket 31. The shaft 49 is keyed to a sprocket wheel 51 over which is trained the chain 52 leading to driving mechanism hereinafter described for rotating the shaft 49 and actuating the crank mechanism 48 and bell crank lever 43, whereby the slide 40 is reciprocated from the position shown in Fig. 3 to the position shown in Fig. 4.

The pusher 37 is actuated also by the movements of the slide 40. To accomplish this, the arms 36 are pivotally connected at 53 to the ends of rods 54, the other end of which extend through an opening in a depending bracket 55 at the end of the slide 40. The bracket 55 is provided with an extension 56, the front end of which confronts a similar member 57 which extends from a cross piece 58 between the rods 54. When the slide is in its outermost position, which is that shown in Fig. 3, a depending lug or pin 59 on the slide 40 is in contact with the cross piece 58. When the crank mechanism 48 is actuated to oscillate the bell crank 43 to carry its upper end toward the magazine 32 from the position shown in Fig. 3, the slide 40 is also moved toward the magazine and initially the part 56 engages the member 57 moving the rod 54 to the left and thus oscillating the pusher 37 on its pivot 38 to place it in the position of Fig. 4. After this has taken place, the part 56 rides past the abutment 57 so that the slide 40 continues to move through the magazine 32 and push the lowermost end closure 33 on to the face 37' of the pusher 37 as shown in Fig. 4. During this movement, the forming horn has been approaching station No. 1 and when the forming horn reaches station No. 1 the Geneva gear mechanism stops the table and horn while the crank mechanism 48 returns the slide 40 from the position of Fig. 4 to the position of Fig. 3, during which the part 56 rides off of the abutment 57 and the lug 59 approaches the cross piece 58. When the lug 59 engages the cross piece 58 it exerts a pull on the rods 54 and oscillates the pusher 37 to place the end piece 33 which has been fed thereon against the end of the horn. Now, when the horn reached station No. 1, as previously mentioned, the passages 28 leading from the end ports 27 to the ports 29 have placed the end ports in communication with the channel 23 and hence in communication with the suction apparatus, so that when the pusher 37 places the end piece 33 against the end of the horn at station No. 1, the suction is on at the end ports and the end piece is held on the horn thereby. The horn then moves to station No. 2 to receive the main body blank or strawboard liner.

The construction and arrangement of the parts comprising station No. 2 are shown in detail in Figs. 7–10, wherein the numeral 61 designates a bracket also rigidly secured to the frame 9 and supporting a top plate or table 62 above which is mounted the magazine 63 in which are arranged the blanks or liners 64 (shown in detail in Fig. 29) in the nature of rectangular pieces of cardboard scored along lines $a$ to provide panels $b$, $c$, $d$, $e$ and $f$, of which panels $c$ and $e$ form the front and back, and panels $b$, $d$ and $f$, the sides of the completed carton, with the panels $f$ and $b$ overlapping. Referring again to Figs. 7–10, the plate 62 is provided with slots 62' receiving rack bars 65 movable along the slots beneath the magazine 63. To the tops of the rack bars 65 there is connected a pusher plate 67 movable across the table 62 beneath the magazine 63, running in the guide ways 66, and of a thickness corresponding substantially to that of the blanks 64, whereby it may push a blank forwardly from beneath the magazine 63 to mechanism hereinafter described for feeding the blanks to the forming horns. Toothed segments 68 are in mesh with the teeth on the rack bars 65, and are connected by arms 69 to hubs 70 journaled on a shaft 71 supported by opposite side plates of the bracket 61. A lever 72 is pivotally connected at 73 to a link 74, said link being connected to a crank disc 75 by means of the crank pin 76. Crank disc 75 is fixed to shaft 78 which is driven by a sprocket 79 and chain 80, which is also (see Fig. 2) trained over a sprocket 81 on a shaft 82 driven by suitable gears from the shaft 15. The rotation of the crank wheel 75 will impart to the link 74, a reciprocating motion to rock the lever 72 and oscillate the segments 68 since lever 72 is connected to shaft 71, whereby the rack bars 65 will be reciprocated to move the pusher 67 back and forth under the magazine 63. Obviously, each time the pusher 67 moves forwardly or to the left of the position shown in Fig. 7 to the position shown in Fig. 8, one of the blanks 64 will be pushed forwardly until it has passed under latches 83 having hooked ends 84 disposed immediately in front of the magazine 63. The latches are pivotally connected at 85 to supporting arms 86 mounted on a support 87 above the table 62. Forward movement of each member 64 brings its front edge initially into contact with the beveled face of the hooked end 84, whereby the latches are raised so that the blank may pass thereunder and when the member 67 reaches the limit of its forward movement, the rear edge of the blank is engaged by the shoulder of the hooked end 84. Rods 88 are also mounted in the slots 62' for reciprocating movement by the racks 65 simultaneously with the pusher 67. Dogs 89 are pivotally mounted at 90 to the rods 88 and springs 91 normally hold the front ends of the dogs above the tops of the rods 88. At the time that the pusher 67 is in the position of Fig. 7, the front ends of the dogs 89 are substantially in alinement with or slightly behind the hooked ends 84 of the latches 83 and just behind the rear edge of the blank 64 beneath the latches, so that forward movement of the rack 65 will move the blank 64 from beneath the latches 83, due to engagement of the dogs 89 with the rear edge of the blank, whereby the blank will be positioned beneath the horn which has moved to station No. 2 with the end closure 32 on its end. In starting a blank 64 is placed under latches 83.

The relative position of the end closure and blank 64 after the dogs 89 have moved the blank 64 beneath the horn is shown in Fig. 29, wherein the end closure 32 is perpendicular to the panel c with its ends in alinement with the creases a at opposite sides of the panel c. In Fig. 29, it will also be noted that the panel f is bent upwardly. This is accomplished at station No. 2 by the member 92 which has one arm 93 connected to a pinion 94 and its other arm 95 extending toward and into an opening 96 in the top 62. The member 92 is located in alinement with the latches 83 and hence in alinement with the blank thereunder. Now, when the blank 64 is delivered beneath the latches 83, the panel f is disposed above the opening 96. The shaft 97 on which the pinion 94 and member 92 are mounted is journaled through and supported by brackets 98 on the bracket 61. A rack bar 99 has its teeth in mesh with the pinion 94 and is slidable in a frame 100 on the bracket 61. A stud or roller 101 projects outwardly from the frame 100 through slot 102 and is disposed against the cam disc 103 operated by and keyed to the shaft 71. The member 92 is normally held in the down or full line of Fig. 10 by a spring 104 connected at its top to the member 92 and at its bottom to a stud or screw 105 on the bracket 61. When the shaft 71 is rotated by the crank 75 and link 74, the projection on the cam disc 103 engages the stud or roller 101 lifting the same and hence raising the rack bar 99 and rotating the pinion 94 and also member 92 to the dotted line position of Fig. 9, so that the panel f which is disposed above the end of the member 92 and opening 96 is bent up to the dotted line position of Figs. 9 and 10 and the full line position of Fig. 29. To hold blank 64 down while finger 92 is turning flap f to the angular position, flat spring members 87' are provided which are mounted on support 87. These also tend to guide the blank or rather hold it down so that pushers 89 will not ride under the blank.

When the horn 12 arrived at station No. 2 it was in alinement with the panel c on the blank 64 and thus ports 29 which communicate with ports 27 in the lower face of the horn were disposed over the wider portion of the channel 23, and therefore in communication with the suction apparatus so that when the blank 64 is pushed under the forming horn, as shown in Fig. 29, it is held to the horn by the suction through ports 27 in the bottom face of the horn. The horn is then ready to move to station No. 3 with the end closure 33 held to the end of the horn, the panel c below the horn and below the end closure 33.

While the foregoing operations were taking place, the outside wrapper was being prepared and position at station No. 3 for proper association with the blank 64 in the condition and position in which it left station No. 2.

The construction and arrangement of the parts constituting the mechanism of station No. 3 is shown best in Figs. 1, 11 and 12. Referring to Figs. 1 and 11, the numeral 106 designates uprights on which are brackets 107 provided with trunnions 108 rotatably supporting a shaft 109 on which is a drum 110 containing a roll of paper of predetermined width. The uprights 106 also rotatably support a shaft 111 to which is keyed a sprocket wheel 112 continuously rotated by a sprocket chain 113 and sprocket wheel 114 driven by a stub shaft 115 (Fig. 11) on which there is a sprocket wheel 116 over which, and a sprocket wheel 117 on shaft 119, is trained a chain 118. The shaft 119 is driven by a gear 120 (Figs. 2 and 12) meshing with the gear 121 on shaft 15'.

Referring again to Figs. 1 and 11, particularly the latter, there is shown also keyed to the shaft 111 a roller 122. Another roller 123 is mounted on the shaft 124 above the roller 122 and between the uprights 106. The shaft 124 is journaled in blocks 125 normally urged by springs 126 downwardly or toward the roller 112. The springs are mounted around stems 127 connected to the blocks 125 and to cam discs 128 on the shaft 129 which may be turned by the handle 130, whereby the shaft 124 may be raised or lowered with respect to the shaft 111 to raise and lower the roller 123 with respect to the roller 122. The paper from the drum 110 runs first through rollers 131 journaled between the uprights 106 and then between the rollers 122 and 123, under a roller 132 on a frame 133 slidably mounted on uprights 134, then up and over a roller 135 on a shaft 136 adjustably mounted between the uprights 134 through slots 137 and held in desired position by nuts 138. The paper then comes down and under another roller 132' journaled on the frame 133 in alinement with the roller 132, and over a roller 139 journaled between brackets 140 on uprights 141; and then across the plate 142 on uprights 141, and between rollers 143 and 144, across the plate 145 on uprights 141 and plate 146 and between rollers 147 and 148, across plate 149 to the adhesive applying and wrapper positioning apparatus hereinafter described. Rollers 143 and 144 are geared together by gears 143' and 144'. The roller 144 is journaled on the shaft 150 between uprights 141 and a gear wheel 151 is keyed to the shaft 150. Also, between uprights 141 and below the shaft 150 is a shaft 152 to which is keyed a Geneva gear 153 and a gear 154 meshing with the gear 151. Adjacent sprocket wheel 114 is a Geneva driving disc 156 which carries a lug 156' engaging between the teeth on the Geneva gear to impart to the same a quarter turn each time the wheel 156 makes a complete revolution, whereby the gears 154 and 151 and rollers 143 and 144 are rotated a predetermined amount. The roller 143 is mounted on a shaft 157 in an adjustable mounting indicated generally by the numeral 158 and identical to the mounting for the shaft 124 previously described. Inasmuch as the roller 143 is constantly urged toward the roller 144 and driven therefrom the paper is gripped therebetween so that each time the rollers 143 and 144 turn a predetermined amount the paper will be fed across the plates 145 and 146 a predetermined distance. At this point, I would explain that the paper from the drum 110 is constantly pulled by the rollers 122, 123, whereas the paper between the rollers 143 and 144 is intermittently pulled. It is for this reason that I provide the compensating arrangement of the rollers 132, 132' on the slidable frame 133, as each time the rollers 143, 144 pulls the paper the frame will slide up, and each time that the rollers 143, 144 are idle the frame 133 will slide down, so that the paper will always be under proper tension. To facilitate this operation, cables or ropes 159 are attached to opposite sides of the frame 133 and run over pulleys 160 journaled at 161 on the uprights 134. To the other end of the rope there is attached a weight 162 compensating for the weight of the frame 133 and rollers 132.

In order to cut the web of paper into predetermined lengths and form the wrappers, I provide intermediate the plates 145 and 146, a pair of cutting blades. One of the blades 163, is pivotally mounted on a stub shaft 163' journaled in the trunnion 164 supported by plate 186 on uprights 185. The outer end of the blade 163 has a projection 165 received in the end of a link 166. The other blade 167 is fixedly secured to the support 164 beneath the paper. The other end of the link 166 is pivotally connected at 168 to a lever 169 carrying a projection 170 and pivoted at its other end at 171 to the frame or uprights 141. On the shaft 115, there is a cam wheel 172 having a formation to engage the projection 170 each time wheel 172 rotates to thereby oscillate lever 169, link 166 and the blade 163 so that the paper will be severed between the blades 163 and 167 and plates 145 and 146. That portion of the paper on the plate 146 is of predetermined length and is disposed between the rollers 147 and 148, the former being mounted on a shaft 173 carried by a mounting similar to the mounting 158 and 123 with a spring urging it down, so that the roller 147 yieldably contacts roller 148, whereby the paper is tightly gripped between the rollers. Shaft 173 is keyed to a gear 147' and the roller 148 is on the shaft 174 (Fig. 11) mounted between the sides of the frame and is keyed to a sprocket wheel 175 over which is trained the chain 176. A sprocket wheel 177 is keyed on the shaft 119. The chain 176 is also trained around the sprocket wheel 177. Shaft 174 is also keyed to a gear meshing with 147'. Thus, the rollers 147, 148, are rotated by the gears and sprockets 177, 175, and chain 176, so that the cut lengths of paper will be fed across plate 149 to the adhesive applying mechanism.

Uprights 185 support a plate 186 on which are mounted the cutting knife and frame 186' for the rollers 147, 148. This latter frame has secured thereto a bracket 187 supporting the adhesive applying frame 188 in which is located a glue container 189. The bottom of the container 189 is open and at one side thereof there is a flexible strip 190 contacting roller 191, which is mounted below the open bottom of the container 189, on a shaft 192 to which is keyed a gear 193 (see Fig. 12). The table 186 also supports an electric motor 194 which drives gear 195 meshing with the gear 193, whereby the roller 191 is rotated in a contra-clockwise direction. Rollers 196 and 196' are mounted beneath the roller 191 in contact therewith and substantially in alinement with the plate 149. On the side of the roller 191 opposite to the plate 149, is a rod 197 supporting fingers 198 having pointed ends disposed between rollers 196' and 191. The piece of paper between rollers 146, 148, which was severed by the cutting blades 163, 167, is fed between rollers 191 and 196. Since the surface of the roller 191 is coated with the adhesive from container 189, the paper will be coated with adhesive on one face and fed between rollers 196' and 191. The pointed ends of the fingers 198 prevent the paper from rotating with the roller 191 past the roller 196' and consequently the paper is deposited in a position on the turret indicated generally by the numeral 199, such position being determined by the stop or guide 200. This piece of paper is the wrapper to be applied to the blanks carried by the forming horn and the upper face of the wrapper is that which is coated with the adhesive.

The wrapper is held in the predetermined position on the turret by the frame 200 and vacuum through suction portions 201 and channel 202 in the turret, and connection to suction apparatus hereinafter referred to. The wrapper is relatively thin and light, and I have found that the suction is more effective if the paper is forced down against the turret above the ports 201. To this end, I provide a pipe 203 connected by valve 204 to a pipe 205 leading from a source of compressed air. The valve 204 has projecting therefrom a stem 206 normally held in the position shown in Fig. 11 by any suitable means, such as a spring within the valve casing. At any suitable point, such as station No. 1, I mount the valve 204 on the main frame. A lever 207 is pivoted on the bracket 31 supported by frame 9.

Beneath the lever 207 is a cam disc 209 keyed to the shaft 49 which is driven by sprocket 51 and chain 52 running over sprocket wheel 213 keyed to shaft 119. Hence, every time the shaft 119 makes a revolution the cam wheel 209 is rotated so that the projection on the wheel 209 will rock the lever 207 and open the valve 204, whereby a blast of air is projected through pipe 203 on to the wrapper which has been delivered on to the turret 199, so that when suction is applied through ports 201, the wrapper will be pressed against the turret and firmly gripped against the turret by the suction through ports 201.

The table or turret 199 is provided with diametrically opposite openings 214, 214' (see Fig. 12), and these openings are brought below and within the wrapper guiding frame 200 (see Fig. 1), and surrounded by ports 201. One of the openings 214 or 214' is disposed in front of the wrapper sheet delivery mechanism at the time a wrapper is being fed outwardly on to the turret above the opening. At such time the forming horn, which has moved from station No. 2 is disposed over the other opening for application of the wrapper to the blank carried by the forming horn in the manner presently described. While a wrapper is being applied to the forming horn at station No. 3, a blank is being applied to the succeeding forming horn at station No. 2, and another wrapper is being prepared and delivered on to the turret. Hence, when the succeeding forming horn moves to station No. 3, the wrapper which is being delivered is moving to position for association with the blank on the said succeeding forming horn which is moving from station No. 2.

Referring now to Figs. 12–14, wherein the wrapper applying mechanism is best illustrated, it will be noted that the turret or table 199 is mounted on a shaft 215. On the said shaft and above the turret is a cap 216 engaging a washer or plate 217. The cap 216 is substantially cup-shaped to provide the suction passage 202 previously mentioned. The top of the shaft also has secured thereto a washer or abutment 218 which may be held rigidly in place by a nut 219, so that a coil spring 220 is compressed between the abutment 218 and the end of the cap 216 to urge the cap down against the plate 217 and maintain it in proper position.

Referring momentarily to Fig. 1, it will be noted that a conduit 221 leads into the cap 216 in communication with the chamber or passage 202. This conduit may be connected to suction apparatus not shown.

Secured to the upper end of the cap 216, is a tubular member 222 having a lateral projection 223 rigidly supporting a pin 224 which is connected to a rod 225 fixedly secured to any fixed part of the frame such as a bracket 226, whereby the member 222 and cap 216 are held against rotation. Beneath the turret and around the shaft 215 are interfitting plates 227 and 228, the turret resting on the former, and the latter having a boss 229 through which the shaft 215 extends. Below the boss 229 and keyed to the shaft 215 is sprocket wheel 230 around which is trained the sprocket chain 231, also trained around the sprocket wheel 232 on and driven by the main shaft 13 of the table 11. The ratio of the sprocket wheels 230 and 232 is such that every time the table 11 makes a one-eighth revolution the turret 199 makes a one-half revolution. The lower end of the shaft 215 is supported in a journal 233, which as shown in Figs. 11 and 12, is supported by levers 234 connected to the journal by pivot pin 235. One end of the lever 234 is pivotally connected at 236 to a bracket 237 which is rigidly connected to an elongated boss 238 connected to the frame by webs 239. The other end of the lever 234 is pivotally connected at 240 to a crank arm 241 connected at its lower end to a crank shaft 245, one end of which is keyed to a sprocket wheel 246, over which and a sprocket wheel 247 on shaft 119 is trained the chain 248. Obviously, the sprocket wheel 247 is driven by the shaft 119 previously described. Under the foregoing arrangement, the turret is intermittently rotated and raised and lowered as later pointed out in detail.

Referring to Fig. 12, a plate 249 is rigidly connected to the top of a rod 250, which is pivotally connected by the pin 251 to crank rod 252, which is driven by cam wheel 253, also keyed to the shaft 245. Inasmuch as the plate 249 is normally disposed in and substantially closing the opening 214 in the turret when the paper wrapper is being delivered, and inasmuch as the turret must rotate to deliver the wrapper at a diametrically opposite position from that shown in Fig. 12, the plate 249 must be removed from the opening during such rotation of the turret. This is accomplished by the crank 252, the operation of which is such as to lower the plate 249 during rotation of the turret and to raise the plate 249 to the position shown in Fig. 12 when the turret is stationary.

When the turret is rotated to bring the opening 214 and the wrapper disposed thereabove into the position of the opening 214' of Fig. 12, the forming horn has brought the blank in the condition illustrated in Figs. 29 and 30 over the turret as shown in Fig. 12. The relative positions of the blank and wrapper at such time are as shown in Fig. 30. The crank shaft 245 then raises crank arm 241 and lever 234, so that the journal 233, shaft 215 and turret are raised until the pasted face of the wrapper contacts the blank on the forming horn. To firmly hold the wrapper and blank in proper relative position at station No. 3 during operations about to be described, I provide a pad 255 in a plate 256 supported by a shaft 257 which is mounted in sleeve 258 supported by a boss 259 on the frame. The lower end of the shaft 257 is hollowed as indicated at 260 to receive a coil spring 261 which is also within the sleeve 258 and the lower end of which rests on the end 262' of a coupling 262. The coupling 262 is pivotally connected at 263 to the upper end of link 264. The end 261 is reduced and is within the sleeve 258, and the portion of the member 262 around the reduced end 261 is in engagement with the sleeve 258. As shown in Figs. 12 and 13, a pin 265 is mounted through sleeve 258 and slot 266 in the bar 257. The link 264 is connected at 268 to a crank disc 270 driven by the shaft 245. When the link 264 is lowered by operation of the crank, the plate 256 and pad 255 will be withdrawn from the opening 214' or 214, whichever happens to be in the position shown in Fig. 12, in the same manner that the plate 249 is lowered and at the same time which is during rotation of the turret. When the turret stops with say the opening 214' in the position shown in Fig. 12, and the wrapper beneath the forming horn, the crank raises the link 264, whereby the sleeve 258 and rod 257 also are raised, which movement occurs after the turret has come to rest and has been raised to bring the wrapper into contact with the blank on the forming horn as shown in Figs. 13 and 14. The pad 255 is then pressing against the wrapper beneath the panel c on the blank, and due to the slot 266 and pin 265 the pressure against the forming horn may be relieved, as the rod 257 can yield down against the spring 261 with the slot moving relatively to the pin 265.

It will be noted in Figs. 13 and 14, that the pad 255 does not fill the entire opening in the turret, but, as stated, contacts the wrapper beneath the panel c, so that the panels d and e lie in the plane with panel c with the panel d above a roller 272 supported in a bracket 273 on a rod 274, the lower end of which (see Fig. 11) is pivotally connected at 275 to one end of the lever 276, the other end of which is pivotally supported at 277 on a fixed support 278. Intermediate its ends the lever 276 has connected thereto a lug or roller 279, which is disposed in a cam slot 280 in wheel 281 keyed to and driven by shaft 119. The formation of the cam slot 280 is such that the lever 276 will be oscillated at proper intervals to reciprocate the rod 274, whereby on upward movement of the rod the roller 272 will pass against the panel d and portion of the wrapper thereover bending the panels d and e from the dotted line position of Fig. 14 to the full line position, at which time the suction will be on at those ports in the side of the forming horn on the face against which the panel d is disposed. The rod 274 is then drawn downwardly to a position below the turret and out of the opening 214', as is plate 249 and pad 55, so that the turret may rotate one-half revolution to receive a new wrapper and bring another beneath the next horn.

Inasmuch as the panel e will be folded down against the upper face of the forming horn with the panel f against the side of the forming horn opposite the panel d, to be held in place by suction through ports on the top and other side of the horn, and the panel b is to be bent up against the panel f, I preferably apply at station No. 3 a spot of glue 282 on panel b, so that it will be held firmly to the panel f, while the formation of the pouch is being completed (see Figs. 30–33). The means for accomplishing this is shown best in Figs. 12 and 1, wherein the numeral 283 designates generally a glue spotter in the nature of a container supported in a frame 284 on a lever 285 pivotally connected at 286 to a support 287 above the turret 11. At the side of the turret 11 opposite station No. 3, the lever 285 is provided with a lug 285' disposed in the forked end 288 of crank 289, which carries a lug or roller 290 disposed in cam slot 291 of a drum 292 on shaft 293, which is driven by mechanism hereinafter described in connection with station No. 7. Obviously, when the crank 289 oscillates, it will rock the lever 285 on its pivot 286 to raise and lower the spotter 283 to apply the spot of glue 282 to the panel b.

After the foregoing steps have been performed at station No. 3, and the parts 249, 255 and 272 have been lowered out of the openings 214, 214', the turret begins its one-half revolution and the forming horn with the blank and wrapper in the position shown in Fig. 31 begins to move to station No. 4. During movement of the said forming horn between stations Nos. 3 and 4, the panel e is bent down against the top of the forming horn by mechanism shown in Figs. 15, 16, comprising a roller 295 mounted on a pin 296 in bracket 297 on rod 298. The bracket and roller 295 are supported by the rod at a predetermined distance above the forming horn, such that the roller will contact the wrapper and panel e and press the same down against the forming horn as shown in Fig. 15, wherein the arrows indicate the bracket and roller 295 moving to the right and the forming horn and blank moving to the left. When the panel e is folded down against the top of the forming horn, suction is on the ports in the top of the forming horn and also in the ports on the right side of the forming horn, in respect to the position shown in Fig. 15, so that panels e and f will be held against the forming horn by suction. The blank is then substantially encircling the forming horn with the exception of panel b and one end of the wrapper.

Referring to Fig. 1, it will be noted that an arcuate track 299 is provided above the turret, and the rod 298 has a guide 300 engaging the track. One end of the rod 298 is connected at 301 to one end, 302, of a bell crank lever pivotally mounted on upright 303, and the other end 304 of the bell crank lever is connected at 305 to a coupling 306 which carries a rod 307, one end of which extends into a tubular housing 308. The other end of the housing 308 receives a rod 309 carried by a coupling 310 connected at 311 to one end of a lever 312, the other end of which is connected at 313 to a link 314, said link 314 being connected at 315 to crank 316 and which as shown best in Fig. 12 is driven by the shaft 15. The lever 312 is pivoted intermediate its ends at 317 on a fixed support 318. Obviously, the crank 316, through the link 314, will impart an oscillating movement to the lever 312, whereby the rod 309 is moved back and forth in the housing 308 and against the spring 319 between the rods 309 and 307, so that the spring will push the rod 307 and oscillate the end 301 of the bell crank lever to swing the rod 298 back and forth across the path of movement of the forming horn, as shown in Fig. 1. Referring again to Figs. 15 and 16, it will be noted that the rod is moving oppositely to the direction of movement of the forming horn between stations Nos. 3 and 4, so that the panel e is contacted by the roller and folded down against the top of the horn in the manner previously described.

The mechanism of station No. 4 and the operation which takes place after the forming horn arrives at station No. 4 is shown best in Figs. 16 and 17, wherein the numeral 320 designates a plate supported horizontally at the upper end of a rod 321 which slides in fixed plates 322, and the rod 321 has secured thereto ears 323 between which is pivoted a coupling 324 which is connected to a rod 325 extending into a sleeve 326 and contacting a coil spring 327. Another rod 328 extends into the other end of the sleeve 326 and contacts the other end of the spring 327, and is secured to a coupling 329 connected to a crank 330. The crank 330 is keyed to a shaft 331 which (see Fig. 2) is also keyed to a sprocket wheel 332 over which, and a sprocket wheel 333, is trained a chain 334. The sprocket wheel 333 is on the shaft 82 driven by a gear 336. Referring again to Fig. 17, it will be noted that the plate 320 is in its uppermost position to which it has been raised by the crank and link mechanism associated therewith. On the plate 320 there is an upstanding angle piece 340 having its upper end offset. The angle piece 340 is in such position, relative to the point where the forming horn stops at station No. 4, that it will engage, as shown in Fig. 16, the flap b and free end of the wrapper and fold the same up against the flap f. It will be remembered that the glue spot on the flap f is there for the purpose of securing flaps b and f together. During this operation the rod 298 carrying roller 295 has been returning toward station No. 4 as indicated in Fig. 16, and, as shown in Fig. 17, will engage the upstanding end of the wrapper and press the same down against the top flap of the wrapper and panel e, after which the forming horn moves from station No. 4, to the left of the position shown in Fig. 17, whereby the wrapper passes under a holddown plate 341 which will prevent the pasted top flap of the wrapper from coming free. When the said forming horn moves from station No. 4 toward station No. 5 the next one is moving from station No. 3 to station No. 4, and the roller 295 will contact the upstanding blank and wrapper on said last forming horn and then return and contact the wrapper at station No. 4 after the plate 340 has folded the wrapper upward. Fig. 34 shows the condition of the blank and wrapper as it passes beneath the plate 320 to station No. 5 where the ends of the wrapper are partially folded to the position shown in Fig. 35.

The mechanism of station No. 5 is shown generally in Fig. 1 and more in detail in Figs. 18 to 21 inclusive, and wherein bracket 342 supports uprights 343 through which rods 344 are slidably mounted. The outer ends of the rods 344 are connected by a cross piece 345 through which is mounted a set screw 346 by which the amount of sliding movement of the rods 344 toward the forming horn may be regulated, the set screw acting as a stop when it abuts the outermost upright 343. A strap 347 is fixedly connected to both of the rods 344, and is provided intermediate the rods with a pin 348 disposed in a slot 349 in one arm 350 of a bell crank lever, which is journaled on a shaft 351. The other arm 352 of the bell crank is pivotally connected at 353 to one end of a link 354, the other end of which is connected to a pin 355 on a wheel 356 keyed to and driven by a shaft 357, which is connected to a sprocket wheel 358 (Fig. 21). The sprocket chain 359 which is trained over the wheel 358 is also trained over sprocket wheel 360 on the shaft 119 (Figs. 2 and 12). Returning to Figs. 1 and 18–21, the end of the rods 344 have connected thereto a yoke 361, in the ends of which are journaled rock shafts 362, each carrying folders 363. Referring in detail to Fig. 22, it will be noted that the folder 363 comprises a central portion 364 of substantially the same width as the sides of the container. At each end of the central portions 364 are flaring wings 365. Meshing gear wheels 366, Figs. 18 and 21, are connected to corresponding ends of each of the cranks 362 and one of the gear wheels has a pin or roller 367. Fixedly secured to the uprights 343 is a bar or rod 368 having its end nearest the forming horn bent as indicated at 369. Also slidably mounted through the uprights 343 is a rod 370 carrying the projection or lug 371. The rod 370 is connected to one end of the bell crank lever 372, the other end of which is connected to a link 373 driven by cam 374 working on cam roll 375.

As the forming horn is approaching station No. 5, the rods 344 and parts associated therewith and carried thereby are in the dotted line position of Fig. 19, and the lug 371 is in its innermost position. Upon arrival of the forming horn at station No. 5, the Geneva gear mechanism driving the turret 11 stops the forming horn in the position shown in Fig. 19, whereupon the crank 356 operates to bring the yoke 361 toward the forming horn and positioning the folders 363 alongside of the ends of the wrappers to the position shown in Fig. 22. Following this operation cam 374 retracts the rod 370 and projection 371 which engages with the roller 367 on one of the gears 366 causes the cranks 362 to turn the folders 363 against the sides of the wrapper to the position shown in full lines in Figs. 19 and 21 or from the full line position of Fig. 20 to the dotted line position, whereby the end of the wrapper is partially folded as shown in Fig. 35. After the ends have been so folded, the rods 344 are retracted by the lever 350 and the roller 367 will contact the end 369 of rod 368 and be returned to the dotted line position of Fig. 18, whereby the cranks and folders are returned to the position of Fig. 22. The rod 370 is also moved inwardly to be in position for the next pouch as it comes from station No. 4.

The next step is to apply adhesive to the partially folded ends of the wrapper preferably in the manner shown in Fig. 36, that is, with spots of adhesive on the wrapper and end closure and on one of the flaps of the wrapper. This is done at station No. 6 to which the forming horn moves from station No. 5. Reference should be had to Figs. 1, 23–25 for a clear understanding of the description of station No. 6. A tank 380 containing liquid adhesive such as glue is supported on a bracket 381, and a shaft 382 is journaled through opposite sides of the tank and is coupled at one end 383, to a stub shaft 384 journaled in the trunnion 385 on a support on the bracket 381. A gear 386 on shaft 382 meshes with a gear 387 keyed to shaft 388. A sprocket wheel 390 is also keyed to the shaft 388 and is driven by a sprocket chain 391 trained around the sprocket wheel 392 on shaft 389. Shaft 389 also has keyed thereto a sprocket 390' and is driven by chain 391' trained over the sprocket 392', (see also Fig. 2). A segmental plate 393 is keyed to the shaft 382 for rotation therewith so that the plate 393 will be dipped into the glue each time the shaft 382 makes a complete revolution. Uprights 394 extend above the tank and rotatably support the shaft 395 which carries a plate 396 on one face of which confronting the segmental plate 393 are projections 397, the ends of which are adapted for contact with the surface of the plate 393 to receive adhesive therefrom. The plate 396 is supported or positioned immediately in front of the point at which the forming horn stops and behind the uprights 394 are plates 398 and 399 spaced apart a distance sufficient to permit the forming horn with the wrapper and strawboard liner or blank to pass therebetween with the partially folded ends of the wrapper on the sides of the plate confronting the member 396. The plate 396 also has a projection 400 above the projections 397 and above the segmental plate, so that the small plate 401 on the end of the projection 400 will not be contacted by the plate 393 and therefore will not have adhesive applied thereto. The shaft 395 is oscillated to swing the plate 393 from the position of Fig. 23 to the position of Fig. 25 by a lever 402 connected to the shaft and receiving the end 403 of rod 404 having a projection 405 riding against the surface of the cam wheel 406 on the shaft 389. The end of the rod 404 is provided with a slot 407 through which the shaft 335 extends. The relative movements of the plate 396 and plate 393 is such that the segmental plate wipes across the faces of the projections 397 when the plate 396 is positioned as shown in Fig. 23 and after the segmental plate has passed across the projections, one of the forming horns has positioned the partially folded ends of the wrapper, as shown in Fig. 23. The plate 396 is then swung toward the partially folded ends until the lower projections 397 engage the lower flap on the partially folded wrapper and the upper projections contact the end closure between the partially folded wrapper and also the portions of the wrapper against the end closure. However, the plate 401 contacts the upper flap and no adhesive is applied thereto. When the plate 396 again swings away from the plates 398, 399, to the position of Fig. 23, the partially folded wrapper has adhesive applied thereto as in the manner shown in Fig. 36, and then the forming horn moves to station No. 7 to complete the folding of the wrapper.

The mechanism for completing the folding is shown in Figs. 1, 12 and 26, wherein the numeral 410 designates supports connected to the frame 9 between which is journaled the shaft 293 carrying the drum 292 to the surface of which is secured a segmental brush carrier 413 having tufts of bristles or hair. The shaft 293 is keyed to a gear 414 meshing with the gear 415 on a shaft 411. The shaft 411 is keyed to a sprocket wheel 416 over which is trained the chain 417, which (see Fig. 2) is also trained over a sprocket wheel 418 on the shaft 15'. Obviously, rotation of the shaft 411 will rotate the gears 415 and 414 and rotate the drum and brushes in the direction indicated by the arrow in Fig. 26. The forming horn stops at station No. 7 immediately in front of the drum 292 and beneath a plate 419 rotatably mounted on a shaft 420 supported above the frame 9. A lever 421 is connected to the plate 419 at one of its ends, and its other end is provided with a cam face 422 which contacts a lug 423 on the drum 292. At the front end of the plate 419 there is a depending finger 424 which is disposed above the upper unglued flap when the forming horn stops at station No. 7, at which time the bristles are in the position shown in Fig. 26. When the gears 415, 414 rotate shaft 293 and drum 292, the projection 423 moves across the cam face 422 lowering the lever 421 and turning the plate 419 on shaft 420, whereby the finger 424 presses the unpasted flap down against glue spots on the end closure and portions of the wrapper thereagainst, after which the brushes raise the lower flap and wipe against it completing the folding and pasting of the end of the container.

The container after leaving station No. 7 is in the condition shown in Figs. 37 and 38, and there is no suction on in the forming horn. When the forming horn arrives at station No. 8 from station No. 7, the passages 29 in the turret and forming horn will register with a passage 426 in the support 18. The passage 426 communicates with a conduit 427 leading to a source of air under pressure. When the passages 426 and 29 are in communication, a blast of air will come from the conduit 427 into the passages 28 in the forming horn and blow the container across table 428 on to a continuous belt 429. The belt is trained over pulley 430 on a shaft 431.

I claim:

1. In apparatus for making containers having an end closure around which a blank is folded to form walls of the container, a movable carrier, a plurality of forms thereon on which the closure and blank are assembled, a plurality of stations to which the forms move successively, means at one of said stations to apply the closures to the forms, means at another station to apply the sheets to the forms, means at another station to apply wrappers to the sheets, and means for folding the sheets and wrappers about the forms and against the end closures.

2. In apparatus for making containers having an end closure around which a blank is folded to form walls of the container, a movable carrier, a plurality of forms thereon on which the closure and blank are assembled, a plurality of stations to which the forms move successively, means at one of said stations to apply the closures to the forms, means at another station to apply the sheets to the forms, means at another station to apply wrappers to the sheets, means for folding the sheets and wrappers about the forms and against the end closures, means operable by movement of the carrier to hold the closures and portions of the sheets forming the walls of the containers against the forms, and means to remove the containers from the forms.

3. In mechanism for producing a succession of pouch-like containers, an endless conveyor, a succession of forms carried thereby at spaced intervals, a succession of stations past which the forms are carried and spaced at intervals corresponding to those of the forms, means at one of said stations for applying an end closure blank to the forms, means at another station for applying a liner blank to the forms and along an edge of the end closure, means at the next station for applying pasted wrappers to the liner blanks with the ends of the wrappers extending beyond the end closures and ends of the liner blanks, and means at successive stations to fold the liners and wrappers around the end closures and forms and to fold and secure one end of the wrappers against the end closures.

4. In apparatus for forming containers having an end closure piece and a sheet of cardboard or the like forming walls of the container, a member on which the containers are formed, a plurality of stations at which forming operations are performed, means to move said member successively to said stations, means at one of said stations to apply the end closure piece to said member, mechanism at another station for applying said sheet to the member comprising, a magazine for holding a supply of said sheets, means to remove the sheets successively from the magazine, means to receive said removed sheets and carry them toward the member, means to partly bend said removed sheets and means to apply said sheet to the member to be formed up thereon.

5. In apparatus for forming containers having an end closure piece and a liner forming the walls of the container, a member on which the containers are formed, a plurality of stations at which the forming operations are performed, means at one of said stations to apply the end closure piece to the member, means at another station to apply the liner to the member, means at a succeeding station to adhesively coat a wrapper, means to position the wrapper for application to the liner carried by said member, means to apply the wrapper to the liner, and means to fold the said liner and wrapper about the member and end closure to form the container with overlapping flaps on said wrapper over said end closures.

6. In apparatus for forming containers having an end closure piece and a liner forming the walls of the container, a member on which the containers are formed, a plurality of stations at which the forming operations are performed, means at one of said stations to apply the end closure piece to the member, means at another station to apply the liner to the form, means at another station to adhesively unite a wrapper and said liner with the wrapper projecting beyond the ends of the liner and a longitudinal edge thereof, means to fold the liner up at opposite sides of the form, means to fold the upstanding portions of the liner and wrapper down with the projecting portion of the wrapper overlapping its opposite edge, and means to fold one of the projecting ends of the wrapper in against the end closure.

7. In apparatus for making pouch-like containers having an end closure, a liner and wrapper, a support, a carrier rotatably mounted on said support, a plurality of forms on the carrier on which the containers are formed, a plurality of stations at which the parts are successively applied to and folded against the forms, suction means operable during rotation of the support to hold the parts against the form as they are applied thereto and folded thereagainst, said means including a channel of irregular form between the carrier and support communicating with openings in the forms and terminating substantially at the station where the last folding operation is completed to permit removal of the container.

8. The method of forming a pouch-like container having an end closure piece, a liner forming the walls of the container, and a wrapper, which comprises moving a form successively to a plurality of forming stations, applying the closure piece to the form at one station, applying the liner to one face of the form, adhesively uniting the liner and wrapper with the ends of the wrapper extending beyond the ends of the liner and with one edge portion of the wrapper projecting beyond a corresponding edge portion of the liner, bending the liner and wrapper up at opposite sides of the form, bending the upstanding portions down with the projecting edge portion of the wrapper sealed against its opposite edge portion, and then forming overlapping folds on one of the projecting ends of the wrapper against the end closure piece.

9. The method of forming a pouch-like container having an end closure, a liner, and a wrapper, which comprises moving a form successively to a plurality of forming stations, successively applying the closure, liner and wrapper with the latter projecting beyond the closure, folding the liner and wrapper about the form to provide a tubular structure closed by said closure, folding opposite sides of the projecting end of the wrapper against the closure, and then folding and adhesively holding the other opposite sides of the end of the wrapper in overlapping relation and over said first sides and closure.

10. In apparatus for making containers of the type having an end closure around which a sheet of cardboard or the like is folded to form the walls of the container, a movable carrier, a form thereon on which the closure and blank are assembled, means to apply the closure to the form, means to apply the sheet to the form, means to fold the sheet around the form, means to apply a wrapper to the sheet and closure with the ends of the wrapper projecting beyond said closure, and means to fold the ends of the wrapper in overlapping relation over the closure.

11. The structure of claim 10 wherein, the means to fold the ends of the wrapper comprises elements engageable with opposite sides of the projecting end of the wrapper to move them in against the closure with the other opposite sides of the ends of the wrapper folded upon themselves, means to apply adhesive to the partially folded end of the wrapper, and means to fold the second opposite sides into overlapping relation.

12. Apparatus for forming containers having an end closure piece, a form on which the containers are assembled, a plurality of stations at which assembling operations are performed, means to move said form successively to said stations, mechanism at one of said stations for applying the closure piece to the form comprising, a member mounted for reciprocating movements thru said magazine to remove a piece from the magazine, an oscillating member to receive said piece in one position and place it against the form in another position, means to reciprocate said first member, and means operable by reciprocating movements of said first member to oscillate said second member.

13. In apparatus for making containers having an end closure around which a blank is folded to form walls of the container with a wrapper uniting said blank and closure, a plurality of forms thereon on which the closure and blank are assembled, a plurality of stations to which the forms move successively, means at one of said stations to apply the closure to the forms, means at another station to apply the blanks to the forms, means at another station to apply the wrappers to the blanks with ends of the wrappers extending beyond the ends of the blanks, means operable during movement of said carrier to subsequently fold said wrapper and blank about the form, and means to fold one end of said wrapper against said closure.

14. In apparatus for making containers having an end closure around which a blank is folded to form walls of the container with a wrapper uniting said blank and closure, a plurality of forms thereon on which the closure and blank are assembled, a plurality of stations to which the forms move successively, means at one of said stations to apply the closures to the forms, means at another station to apply the blanks to the forms, means at another station to apply the wrappers to the blanks with ends of the wrappers extending beyond the ends of the blanks, means operable during movement of said carrier to subsequently fold said wrapper and blank about the form, means to fold one end of said wrapper and blank about the form, means to fold one end of said wrapper against said closure, and means to apply adhesive to portions of the folds on said end of the wrapper to hold the folds in overlapping relation.

15. In apparatus for making containers having an end closure around which a blank is folded to form walls of the container with a wrapper uniting said blank and closure, a plurality of forms thereon on which the closure and blank are assembled, a plurality of stations to which the forms move successively, means at one of said stations to apply the closures to the forms, means at another station to apply the blanks to the forms, means at another station to apply the wrappers to the blanks on the forms with ends of the wrappers extending beyond the ends of the blanks, means operable during movement of said carrier to subsequently fold said wrapper and blank about the form, means to fold one end of said wrapper against said closure, means to apply adhesive to portions of the folds on said end of the wrapper to hold the folds in overlapping relation, and means to press said overlapping folds firmly against each other after the application of said adhesive.

16. The structure of claim 15, wherein the means to press the folds against each other after application of the adhesive comprises an oscillating member to bring one fold down, and a rotating element to move the outer fold thereover and firmly thereagainst.

17. In apparatus for forming containers, a movable carrier having a plurality of forms thereon on which the containers are formed, a plurality of stations to which the forms move successively, means at one station for applying sheets to the forms, means at another station to apply wrappers to the flat, unfolded sheets, and means folding the sheets and wrappers simultaneously about the forms and closing the outer ends of the containers on the forms.

18. In apparatus for making containers having an end closure around which a blank is folded to form walls of the container, a movable carrier, a plurality of forms thereon on which the closure and blank are assembled, a plurality of stations to which the forms move successively, means at one of said stations to apply the sheets to the forms, means at another station to apply wrappers to the flat, unfolded sheets, means for folding the sheets and wrappers simultaneously about the forms and across the outer ends thereof, means operable by movement of the carrier to hold the closures and portions of the sheets forming the walls of the containers against the forms, and means to remove the containers from the forms.

19. In mechanism for producing a succession of pouch-like containers, an endless conveyor, a succession of forms carried thereby at spaced intervals, a succession of stations past which the forms are carried and spaced at intervals corresponding to those of the forms, means at one of said stations for applying a liner blank to the forms, means at the next station for applying pasted wrappers to the liner blanks with the ends of the wrappers extending beyond the end closures and ends of the flat, unfolded liner blanks, and means at successive stations to fold the liners and wrappers simultaneously around the forms and to fold and secure one end of the wrappers across the ends of the forms.

20. The method of forming a pouch-like container having a liner forming the walls of the container, and a wrapper, which comprises moving a form successively to a plurality of forming stations, applying the liner to one face of the form, adhesively uniting the liner and wrapper with the ends of the wrapper extending beyond the ends of the liner and with one edge portion of the wrapper projecting beyond a corresponding edge portion of the liner, simultaneously bending the liner and wrapper up at opposite sides of the form, bending the upstanding portions down with the projecting edge portion of the wrapper sealed against its opposite edge portion, and then forming overlapping folds on one of the projecting ends of the wrapper across the end of the form.

21. In apparatus for making containers having an end closure around which a sheet of cardboard or the like is folded to form the walls of the container, a movable carrier, a form on the carrier on which the closure and sheet are assembled, means to apply the closure to the form, means to apply the sheet to the form, said means to apply the sheet to the form including mechanism for adhesively uniting a wrapper to said sheet, comprising a source of wrapper supply, a support to receive the wrappers from said source, means to individually move the wrappers from said source to said support and to adhesively coat one face of the wrapper, and means to bring said face of the wrapper into contact with said sheet when the carrier has brought the sheet into alined relation with the wrapper, and means to fold the sheet around the form and closure.

JAMES C. THOM.